(12) United States Patent
Clermidy et al.

(10) Patent No.: US 6,681,316 B1
(45) Date of Patent: Jan. 20, 2004

(54) NETWORK OF PARALLEL PROCESSORS TO FAULTS-TOLERANT TOWARDS SAID PROCESSORS AND RECONFIGURATION METHOD APPLICABLE TO SUCH A NETWORK

(75) Inventors: Fabien Clermidy, Foncery le Fleury (FR); Thierry Collette, Paris (FR)

(73) Assignee: Commissariat a l'Energie Atomique, Paris (FR)

(*) Notice: Subject to any disclaimer, the term of this patent is extended or adjusted under 35 U.S.C. 154(b) by 425 days.

(21) Appl. No.: 09/763,164

(22) PCT Filed: Jun. 30, 2000

(86) PCT No.: PCT/FR00/01860
§ 371 (c)(1),
(2), (4) Date: Feb. 11, 2001

(87) PCT Pub. No.: WO01/02975
PCT Pub. Date: Jan. 11, 2001

(30) Foreign Application Priority Data

Jul. 2, 1999 (FR) .............................. 99 08553

(51) Int. Cl.⁷ ............................................ G06F 15/173
(52) U.S. Cl. .............................. 712/11; 712/15; 714/10
(58) Field of Search ................... 712/11, 15; 714/10

(56) References Cited

U.S. PATENT DOCUMENTS

| | | | | |
|---|---|---|---|---|
| 5,065,308 A | * | 11/1991 | Evans | ......................... 714/11 |
| 5,323,335 A | * | 6/1994 | Mitchell | ...................... 702/196 |
| 5,748,872 A | * | 5/1998 | Norman | ....................... 714/11 |

OTHER PUBLICATIONS

Popli, S.P., et al., "A Reconfigurable VLSI Array for Reliability and Yield Enhancement," vol. Conf. 2, 11 pages.
John, L.K., et al., "A Dynamically Reconfigurable Interconnect for Array Processors," vol. 6, No. 1, 7 pages.
Shigei, N., et al., "On Efficient Spare Arrangements and an Algorithm with Relocating Spares for Reconfiguring Processor Arrays," vol. E80–A, No. 6, 7 pages.
Clermidy, F., et al., "A New Placement Algorithm Dedicated to Parallel Computers: Bases and Application," 7 pages.
Les Asic "Des circuits de traitement d'images pour la vision industrielle" *Le traitment du signal et de l'image*, p. 3–5.
Nihar R. Mahapatra, et al. "Hardware–Eficient and Highly–Reconfigurable 4–and 2–Track Fault–Tolerant Designs for Mesh–connected Multicomputers" *1996 IEE*, p. 272–281.

* cited by examiner

*Primary Examiner*—Kenneth S. Kim
(74) *Attorney, Agent, or Firm*—Thelen Reid & Priest LLP

(57) ABSTRACT

This invention relates to a network of parallel elementary processors, tolerant to the faults of these processors including said elementary processors, spare elementary processors, elements interconnecting these processors and a control unit, and alternately a series of interconnecting element lines and processor lines, each processor being surrounded by four interconnecting elements, the processor lines being elementary processor lines, the last processor line being a line of spare processors, the edge elements of the network being interconnecting elements, wherein the control unit, connected to processors and interconnecting elements, sends instructions to the processors, controls the interconnecting elements, and checks the integrity of these processors.

11 Claims, 11 Drawing Sheets

| $P_{0,0}$ | $P_{0,1}$ | $P_{0,2}$ | $P_{0,3}$ |
|---|---|---|---|
| $P_{1,0}$ | $P_{1,1}$ | $P_{1,2}$ | $P_{1,3}$ |
| $P_{2,0}$ | $P_{2,1}$ | $P_{2,2}$ | $P_{2,3}$ |
| $P_{3,0}$ | $P_{3,1}$ | $P_{3,2}$ | $P_{3,3}$ |
| $Sp_0$ | $Sp_1$ | $Sp_2$ | $Sp_3$ |

| 1 | 2 | 4 | 7 |
|---|---|---|---|
| 3 | 5 | 8 | 11 |
| 6 | 9 | 12 | 14 |
| 10 | 13 | 15 | 16 |
| $Sp_0$ | $Sp_1$ | $Sp_2$ | $Sp_3$ |

NETWORK OF PARALLEL PROCESSORS TO FAULTS-TOLERANT TOWARDS SAID PROCESSORS AND RECONFIGURATION METHOD APPLICABLE TO SUCH A NETWORK

This application is a national phase of PCT/FR00/01860 which was filed on Jun. 30, 2000 and was not published in English, which claims priority of French application 99 08553 filed Jul. 2, 1999.

TECHNICAL FIELD

This invention relates to a network of parallel processors tolerant to the faults thereof, and a reconfiguration method applicable to such network.

The field of the invention is that of parallel computers for all kinds of applications. Two sample applications are thus given in the document referenced as [1] at the end of the description.

PRIOR ART

The increasing possibilities of micro-electronic technology, as well as the evolution of multiprocessor architectures, are leading to computers that are more and more complex both in terms of elements composing them (electronic gates, memories, registers, processors, . . . ) and in terms of complexity of the software used.

The designers of such computers having a high integration parallel or extensively parallel structure must take into account two conflicting requirements:

1 Machines having a parallel or extensively parallel structure are subject to faults due to the very great number of processors and their complexity, leading to poor manufacturing output and serious faults under normal operation.

2 With highly advanced technologies and high integration systems, more and more processors can be incorporated into an application specific integrated circuit (ASIC), a multichip module (MCM) or a card. In such systems, the main disadvantage is that of limited bandwidth, i.e. the amount of information that can be put through.

In order to meet the first of these requirements, one solution of known art consists in replacing faulty processors with spare processors which are identical to the others from an operational point of view. Such a solution, enabling "structural fault tolerance", then tries to ensure proper operation, and in particular network consistency, so as not to penalize the architecture. It implies reconfiguration consisting in replacing faulty elements with spare elements available due to interconnection elements and intercommunication elements.

In a 2D (or bidimensional) type of network, the solutions proposed for providing fault tolerance are:

adding as many processor lines to the system as faults are to be tolerated. This solution is very simple and requires few spare interconnections, reconfiguration being performed by simply bypassing the lines where there is a faulty processor. Performance loss is then limited. On the contrary, the spare processors are very poorly used as one line is required to tolerate one fault, and in case of a faulty bypass, the whole system is down.

or adding switches, spare processors and connections to the standard network.

As described in the document referenced as [2], a network corresponding to the latter type of solution and called "m-Track, n-Spare" is composed of processors 10, switches and spare connections. Two kinds of switches are used: switches 11 coupling processors with connections (PT=Processor to Track) and switches 12 coupling connections with each other (TT=Track-to-Track). All network links are bi-directional, i.e. communications can come and go in each connection. Spare processors 13 (sp) are positioned at the network borders. For the reconfiguration method to be effective, these processors must be positioned at least in one line and one column of the network.

FIG. 1 illustrates a sample network of the "2-Track, 2-Spare" type. Spare processors 13 (sp) are positioned all around the network and are used to reconfigure the network in case the useful processors 10 are faulty. Switches 11, 12 are used to enable reconfiguration. Here, the network has 200% of spare connections in comparison with the so-called operational connections.

Those skilled in the art can then use a reconfiguration method, based on error correcting codes, which can be broken down into two phases:

the first one consists in finding, for each faulty processor, a compensation track leading from the faulty processor to a spare processor;

In case the first phase is successful, each processor, along the compensation track, is replaced with its nearest neighbour, thus reaching, through cascading changes, a spare processor. The operational grid is thus maintained.

Such a network has many disadvantages:

Bi-directionality of links offers many possibilities for interprocessor routing, but has two major disadvantages in comparison with unidirectional links:

communication time is much longer, on the one hand, due to programming the link direction, and on the other hand, passing through the required circuits for providing such bi-directional communications.

complexity is increased, because interprocessor communications must be handled in order to determine the routing direction;

The number of added connections in comparison with "useful" links, which is a minimum of 100%, makes such a solution inadequate for high integration parallel computers where the bandwidth of certain levels, i.e. the number of connections, is very limited;

Having to add a substantial number of spare processors can lead to problems, in particular for small networks, comprising about a hundred processors, where spare processors can be blamed for 40% of possible faults.

The reconfiguration method considered above, in turn, has two major disadvantages:

it is not suitable for unidirectional links; indeed, in this case, two connection buses, one coming and one going, are required for connecting the considered processor to each of its neighbours.

the number of switching elements passed between two logically neighbouring processors is not deterministic, which makes the method ineffective for dealing with the case of synchronous interprocessor communications.

In order to overcome these disadvantages, it is an object of the network according to the invention to solve the problem of fault tolerance in an extensively parallel architecture with significant processor coupling, by proposing a solution meeting the following constraints:

obtaining a fault tolerant network with connections that may be unidirectional;

highly limiting inoperative communication media of the network;

limiting communication time between processors by limiting the number of reconfiguration switches passed between two processors;

allowing greater flexibility for choosing the number of spare processors;

having a solution capable of supporting different processor topologies, in particular matrix, line or hypercube topologies.

SUMMARY OF THE INVENTION

The invention relates to a network of parallel elementary processors tolerant to the faults of these processors comprising said elementary processors, spare elementary processors, elements interconnecting these processors, and a control unit, characterized in that it comprises alternately a series of interconnecting element lines and processor lines, each processor being surrounded by four interconnecting elements, with the processors lines being elementary processor lines, the last processor line being a line of spare elementary processors, the edge elements of the network being interconnecting elements, and in that the control unit, connected to the processors and interconnecting elements, sends instructions to the processors, controls the interconnecting elements, and checks the integrity of these processors. Each processor is connected to four interconnecting elements, two of these diametrically opposed elements being connected to the two processor inputs, the other two elements, also diametrically opposed, being connected to the two processor outputs, these interconnecting elements being connected together through vertical or horizontal links.

Advantageously, the interconnecting elements inside the network have a complexity of six inputs and six outputs, four inputs and four outputs being connected to the interconnecting elements inside the neighbouring network, and two inputs and two outputs being connected to the neighbouring processors of the interconnecting element inside the considered neighbouring network.

An interconnecting element has at least one unidirectional output and one unidirectional input connected to one input and one output of at least one South/West, North/East, North/West, or South/East processor and at least two unidirectional inputs and two unidirectional outputs connected to at least two outputs and two inputs of the interconnecting elements located North, East, South, or West.

In one embodiment, each processor is a computing element integrating an arithmetic and logic unit, a set of work registers and a test logic allowing the automatic testing thereof to be performed. An interconnecting element is composed of several data multiplexers with n inputs to one output, each of these multiplexers being controlled by wires selecting the output channel in order to allow each of the outputs of the interconnecting element to be connected to any input, with multiplexer selections being stored in two registers inside the interconnecting element.

Advantageously, the processors and interconnecting elements can be integrated in an application specific integrated circuit. The control unit can be integrated in reconfigurable logic components.

This invention also relates to a method of reconfiguring the processor network, comprising:

a step of positioning operational processors of the logic network;

a step of routing consisting in programming interconnecting elements on the physical network, by choosing the maximum number of these interconnecting elements that can be passed between two neighbouring processors using an algorithm for searching the shortest track.

In the method of the invention:

a sequence is determined for positioning the network processors that is composed of a starting processor and a series of processors including all processors;

for each of the processors, it is tentatively positioned starting with its logical position, then, if required in case of failure, in each of the positions located at a distance 1, distance 2, . . . from the logical position of this processor, a restriction being that one and only one spare position must be used with respect to the possible positions of the previously positioned processors, stopping when S+1 positions have been tested, S being the number of spare processors;

if S+1 positions have been tested without success, returning to the previous processor in the positioning sequence and proceeding with the next position for this processor;

possibly, when all processors have been positioned, it is checked for each network dimension that the logical sequence is followed for each pair of processors, if not, the positions of these processors are inverted.

In one embodiment, the positioning sequence is defined like this: the starting processor is the top left processor, the next processors are the processors to the right and below the starting processor, and so on, following a diagonal.

It is also possible to divide the network into blocks and define a block positioning sequence starting with a starting block and going through all the blocks from one neighbouring block to the next, with the positions for the processors of one block not including any logical position of the processors of the previously positioned blocks.

Advantageously, this inventive method can be implemented either statically, or dynamically during operation.

The invention has the following advantages:

The proposed network is applied to all kinds of parallel computers in order to make them tolerant to the faults of the processors and their interconnections. Redundancy is obtained through a very low additional electronic volume (addition of a few processors identical to the others).

The proposed processor interconnection structure allows different topologies of parallel computer architectures to be supported, e.g. processor grid, torus or ring topologies.

The five constraints defined above of the problem to be solved are solved with this network and the associated reconfiguration method.

The proposed structure can be used as a complete network or as a network element, therefore with global or local reconfiguration. The structure, when used as a network element, is particularly suitable for high integration structures with very limited bandwidth. The structure, when used as a complete network, is suitable for integrated structures requiring high fault tolerance.

Whether control via logic gates allows clocking to be distributed over each processor or not, consumption as well as heat dissipation of the network can be improved and optimised. This improvement results in a reduction of the operating temperature of the structure circuits and reliability thereof is thus improved.

The invention, when adapted to a high integration structure, allows to virtually increase the output of the silicon foundry used for making the circuit. Indeed, for a conventional component, if a transistor is defective, the circuit is considered defective, whereas with the proposed invention, the circuit remains operational even with very many faulty transistors, as long as these faulty transistors are distributed inside the same processor or among processors that are not grouped physically, the only limit being the number of spare processors.

DETAILED DESCRIPTION OF EMBODIMENTS

Figure 1:
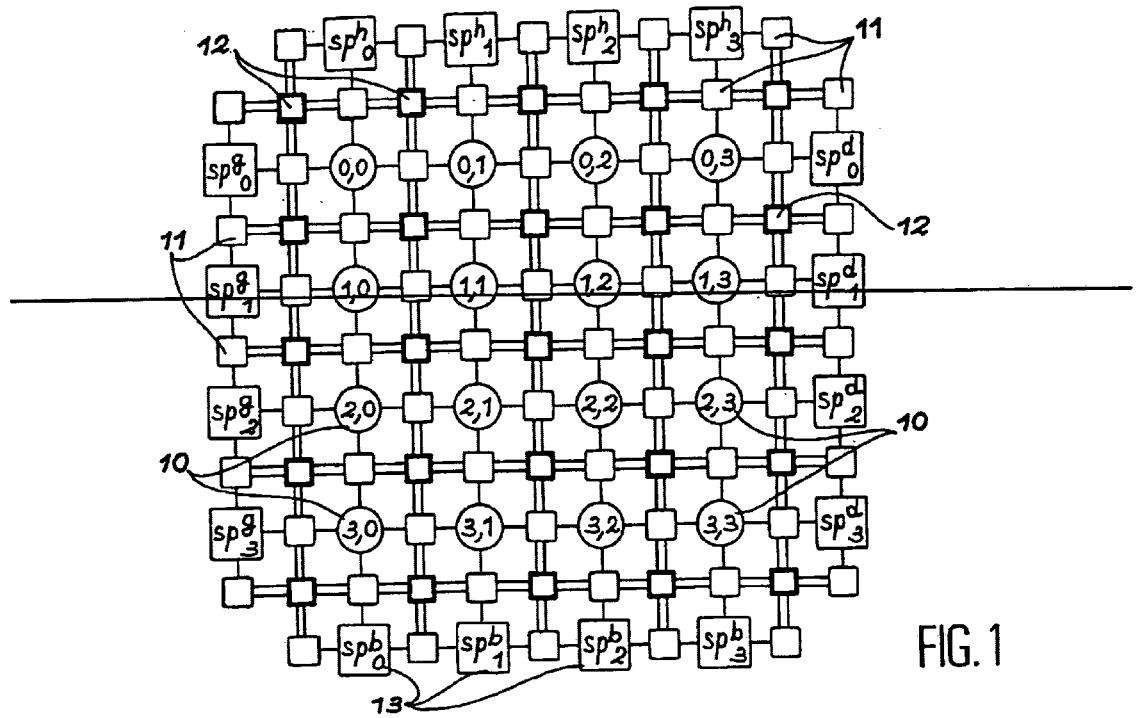
FIG. 1 illustrates a known art processor network.
Figure 2:
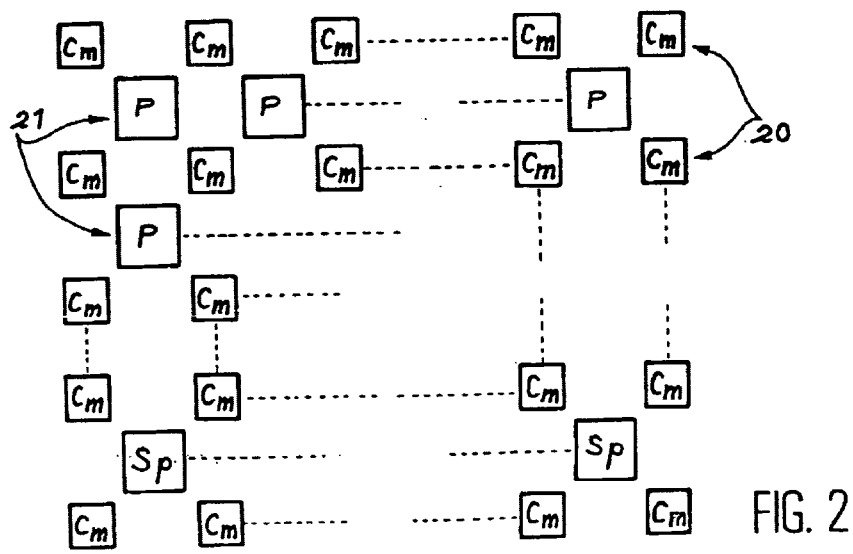
FIG. 2 illustrates the composition of the processor network of the invention.

This invention relates, on the one hand, to a network of parallel processors tolerant to the faults thereof, and on the other hand, a method of reconfiguring such network.
Parallel Processor Network The processor network of the invention, as illustrated in FIG. 2, is based on a matrix of ordinary elementary processors P having two inputs and two outputs, connected together by interconnecting elements Cm. The network is composed of a set of alternately arranged interconnecting element lines 20 and processor lines 21. Each processor P is surrounded by four interconnecting elements Cm. The edge elements of the network are interconnecting elements Cm. The processor lines are lines of elementary processors P and the last line of processors is a line of spare elementary processors Sp. This feature allows greater flexibility to be obtained in the choice of the number of spare processors in contrast with the prior art device illustrated in FIG. 1, wherein with one line and one column of spare processors, the proportion of spare processors varies depending on the product of the number of lines multiplied by the number of columns.

Figure 3:
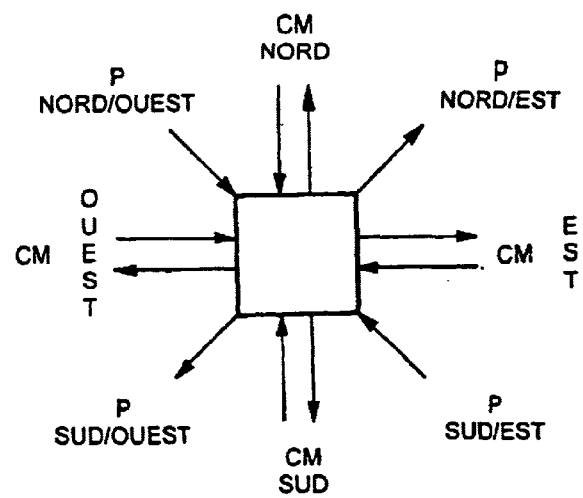
FIG. 3 illustrates the inputs and outputs of an interconnecting element inside the network of the invention.

The interconnecting elements Cm allow links to be made between the various processors P, through network switching. One such element Cm is illustrated in FIG. 3, together with its different inputs and outputs. It has six unidirectional inputs and six unidirectional outputs connected respectively to the inputs of the South/West and North/East processors, to the outputs of the North/West and South/East processors, and to the four inputs and four outputs of the interconnecting elements located North, East, South, and West. One element so represented is an element in the middle of the network.

As illustrated in FIGS. 4A to H, these interconnecting elements of the network edges have fewer inputs and/or fewer outputs according to their location.

Figure 4:
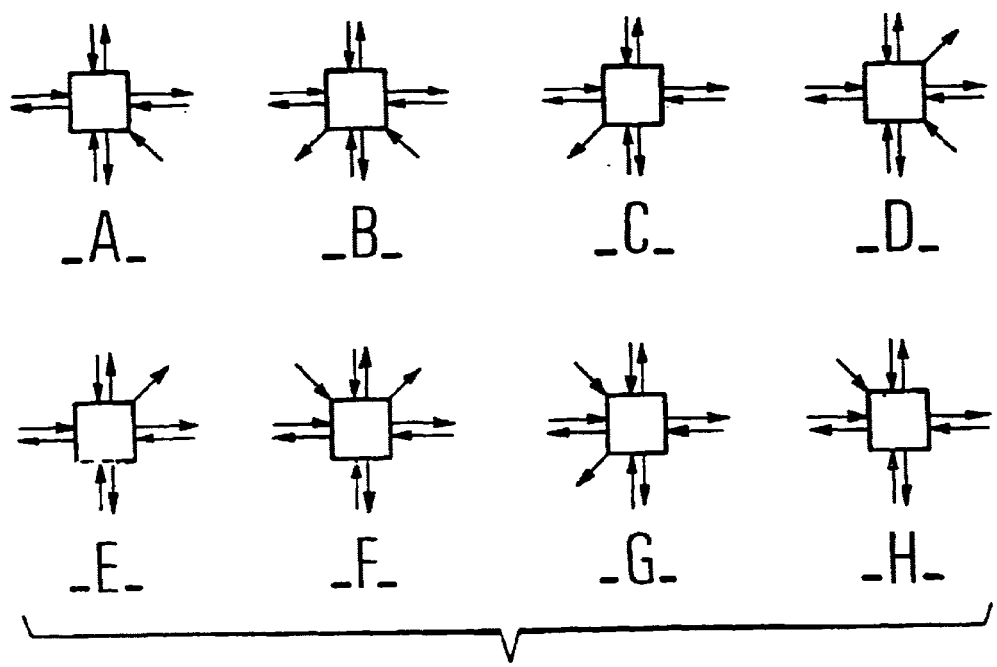
FIG. 4 comprising A,B,C,D,E,F,G, and H illustrates the inputs and outputs of the interconnecting elements at the borders of the network of the invention.

Thus:

| Cm North/West | FIG. 4A; |
|---|---|
| Cm North | FIG. 4B; |
| Cm North/East | FIG. 4C; |
| Cm West | FIG. 4D; |
| Cm South/West | FIG. 4E; |
| Cm South | FIG. 4F; |
| Cm East | FIG. 4G; |
| Cm South/East | FIG. 4H; | is obtained.

Each output of an interconnecting element Cm can be connected to any input. It is possible to dynamically change the way (called configuration) of making these links, e.g. by means of configuration registers associated with a configuration command.

Figure 5:
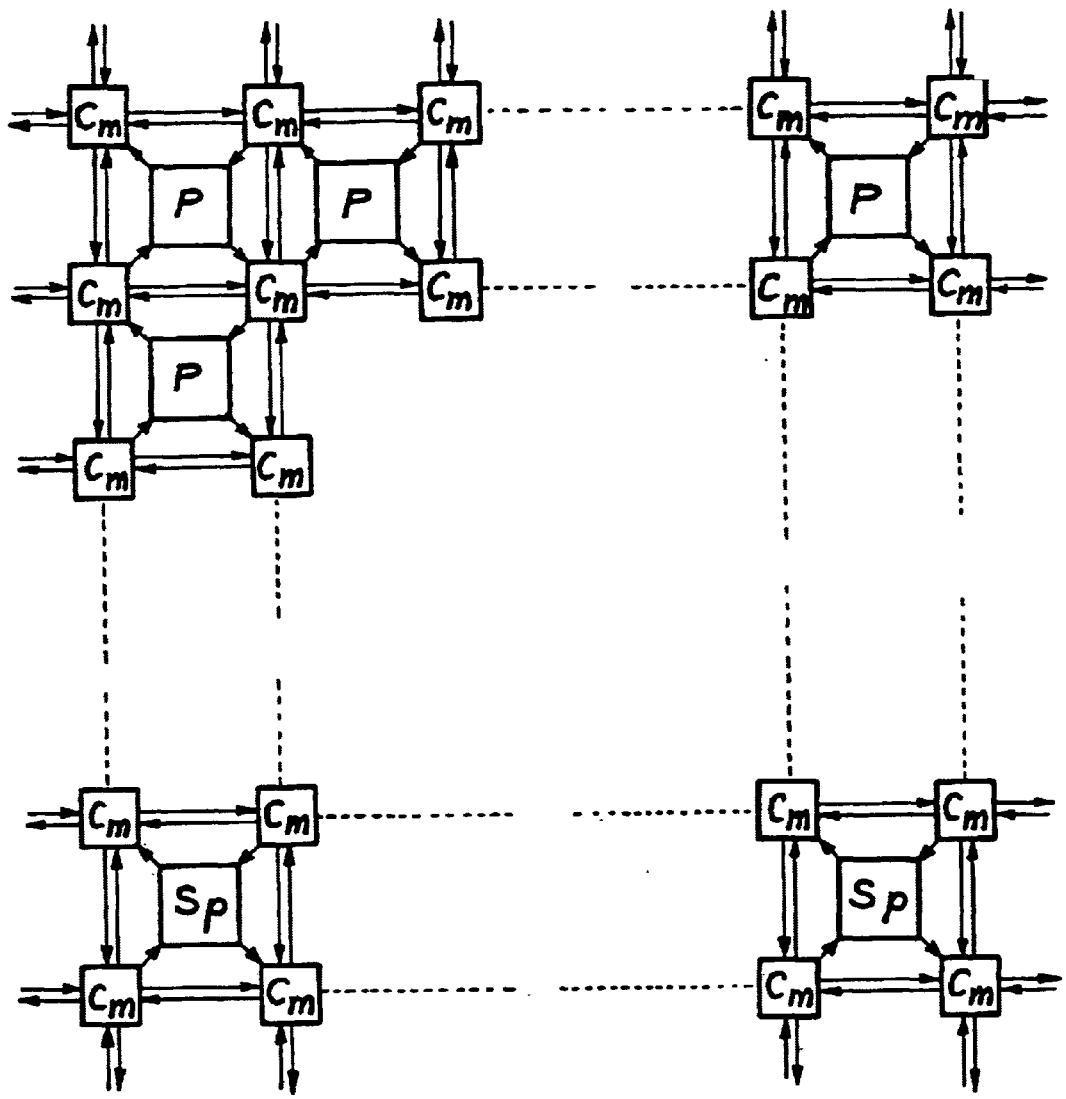
FIG. 5 illustrates the network of the invention, with the links between processors and interconnecting elements.

As illustrated in FIG. 5, in the inventive network, each processor P is connected to four interconnecting elements Cm, two of these diametrically opposed elements Cm being connected to the two processor inputs, and the other two elements Cm, also diametrically opposed, being connected to the two processor outputs. These interconnecting elements Cm are moreover connected together through horizontal or vertical links.

Each communication between processors P is done via interconnecting elements Cm. Thus, 50% of additional internal connections are obtained in comparison with "operational" connections, and additional connections with the outside are reduced to the connections of spare processors Sp.

Figure 6A:
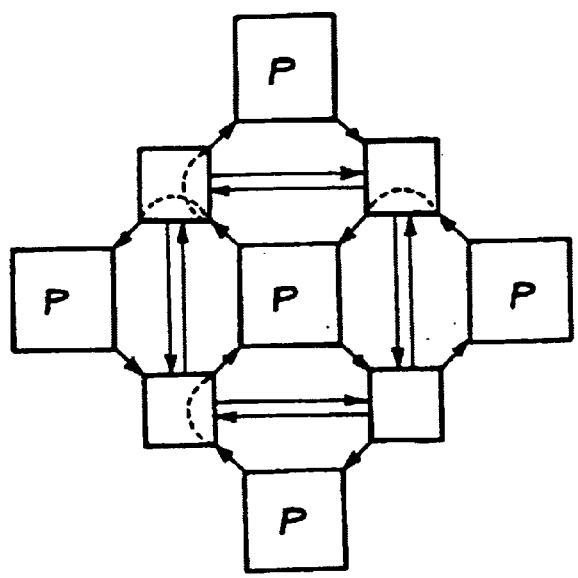
FIGS. 6A, 6B, and 6C illustrate minimum communications in the network of the invention.
Figure 6B:
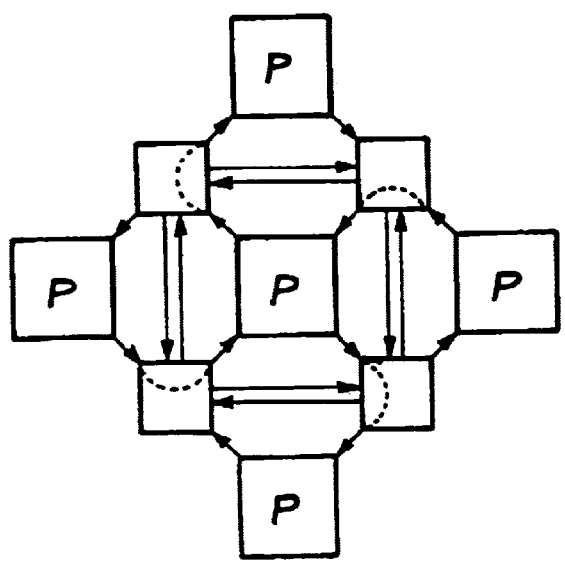
Figure 6C:
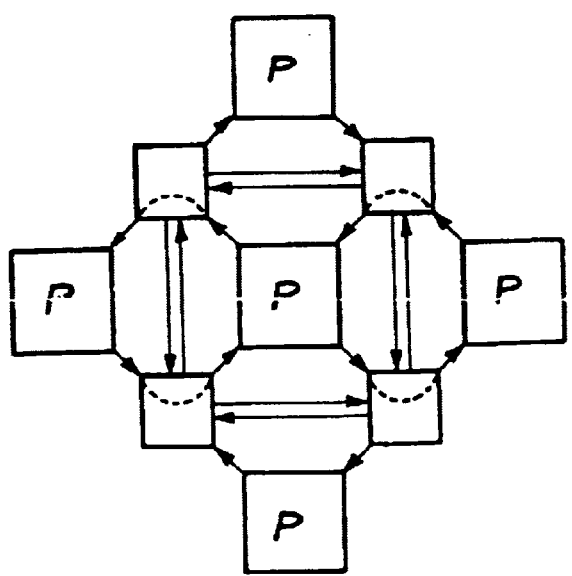

The communications supported by the network are at a minimum those described in FIG. 6: South/North and South/West communications being illustrated in FIG. 6A; mixed communications being illustrated in FIG. 6B; East/West communications being illustrated in FIG. 6C; each communication illustrated in these figures having a "dual" communication.

Other communications can of course be envisaged.

In the fault tolerance method of this network, the spare processors Sp of the last line are used to replace the defective elementary processors P of the other lines.
Reconfiguration Method In the "m-Track, n-Spare" structure of the known art, illustrated in FIG. 1, the reconfiguration method consists in searching for a track called "compensation track" to replace a faulty elementary processor with a spare processor. Then, starting with this faulty elementary processor, each processor is replaced with the next processor available, the nearest one on the track. However, this method is really efficient only when there are spare processors in at least one line and one column, which is not possible with one line of spare processors and two unidirectional tracks. Also, such a method does not allow the number of switches in the communication tracks to be reduced.

On the other hand, the reconfiguration method of the invention is based on a positioning technique not correlated with routing.

Positioning consists in physically positioning logical neighbouring processors. The logical position of a processor is the position this processor occupies in the network without faulty processors; the physical position of a processor is the position occupied by this processor after application of the method when a fault has been detected. Positioning is bound to succeed provided the number of faulty processors is less than or equal to the number of spare processors.

Routing consists in programming interconnecting elements. The number of switches that can be passed between two neighbouring processors is chosen. This number is limited: three or four switches result in good reconfiguration throughput. The routing algorithm can thus test the greatest number of possible routings in a very short time with an appropriate algorithm.

In prior art systems, programming the switching elements is provided in as far as a replacement position has been found for each processor following a precise algorithm. The algorithms for positioning processors on the physical grid and for routing switching elements cannot be dissociated.

In the inventive method, only processor positioning is innovative. Routing interconnecting elements is performed by an algorithm searching for the shortest track, known by those skilled in the art, as this algorithm can be used in the invention due to the restrictions made on track length, and in particular, the number of interconnecting elements passed.

Positioning Step

Figure 7A:
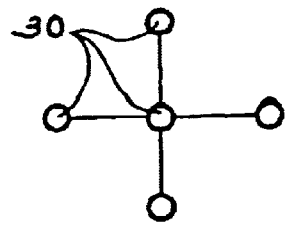
FIGS. 7A and 7B illustrate a sample network of the invention.
Figure 7B:
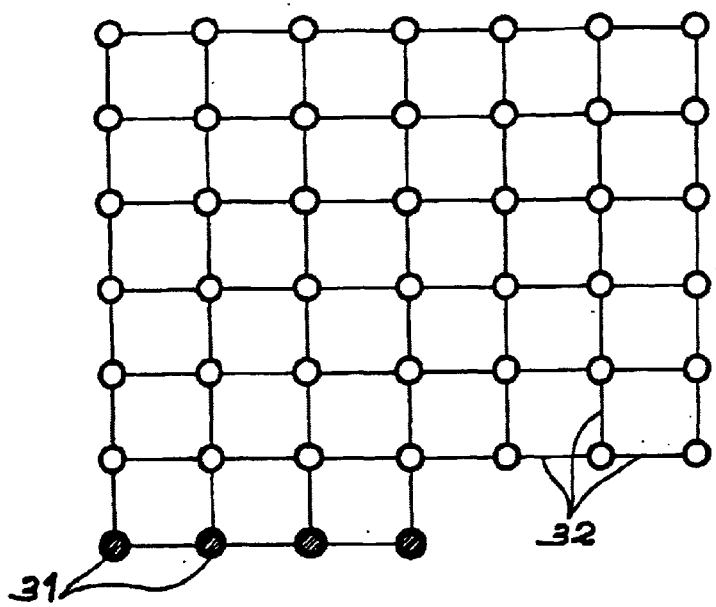
Figure 8:
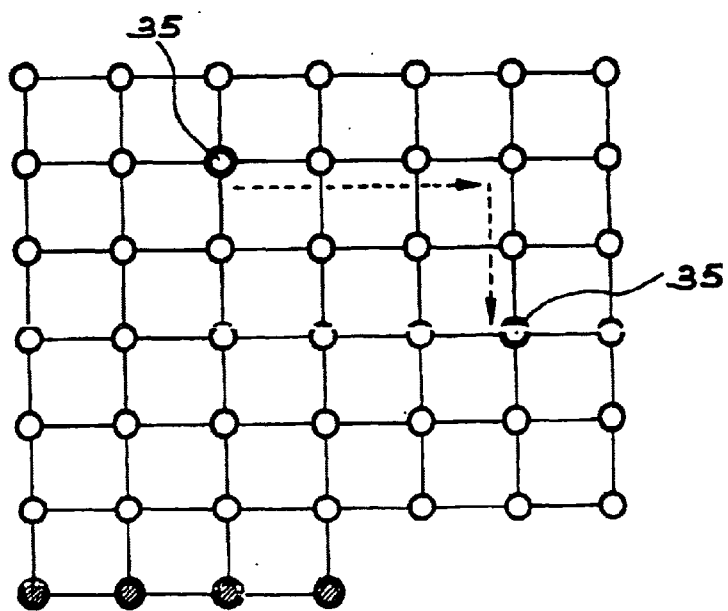
FIG. 8 illustrates the concept of spacing in the network illustrated in FIG. 7B.

FIGS. 7 and 8 schematically illustrate a network of identical elementary processors 30, each elementary processor being logically connected to the same number of neighbouring processors of the same network, except for the processors located at the edges of the network, and spare processors 31 each provided for replacing one of elementary processors 30 in case of failure.

FIG. 7A illustrates a network processor with its four logical neighbours. FIG. 7B illustrates a sample network, with spare processors 31 being shaded, links 32 being logical links.

FIG. 8 illustrates the concept of spacing between two processors: this is the minimum number of connections required for going from one processor to another. The two processors 35 circled in black are at a distance of five from each other, two neighbouring processors being at a distance of one.

It is the object of the inventive method to position processors in the network, so as to minimize the sum of distances between all neighbouring processors. This method has the following characteristics:

Criterion 1: to choose the processor positions in order to provide a minimum distance between neighbouring processors, positioning is performed around the position of the starting processor using processors at a distance of 0, then 1, then 2, then 3, . . . from the logical position of this processor.

Criterion 2: to make sure that positioning is possible for all network processors, whatever the number of faulty or invalid processors, first of all a processor positioning sequence is defined which is composed of a starting processor and a series of processors including all processors. Each new processor is chosen from the processors which are logically neighbours of the preceding processors. Next, following this sequence from the starting processor to the last processor, S+1 possible positions, S being the number of spare processors, and the position sequence of each processor are defined, with a restriction being that one and only one spare position must be used with respect to the possible positions of previously positioned processors.

Criterion 3: to provide global network consistency, at the end of the positioning operation, a mechanism for complying with consistency may be implemented, which consists in detecting logical inversions of each processor pair of logical neighbours in each dimension and in inverting the positions of two processors when such an inversion has been detected.

To meet these various criteria, the inventive method comprises the following steps:

determining a processor positioning sequence as defined above under criterion 2;

for each of the processors, it is positioned tentatively starting with its logical position, then, if required in case of failure (faulty processor or position occupied by another processor) in each of the positions located at a distance 1, a distance 2, etc., while following the rule stated in criterion 2: i.e., one and only one spare position must be used with respect to the possible positions of previously positioned processors. If the position does not follow this rule, another position is tested, which can be at a greater distance if required. The process stops when S+1 positions have been tested;

if S+1 positions have been tested without success, returning to the preceding processor in the positioning sequence and proceeding with the next position for this processor;

when all processors have been positioned, checking for each dimension of the system, e.g. in lines and in columns for a processor array, that the logical sequence is followed for each pair of processors. If not, the positions of these processors are inverted.

Figure 9:
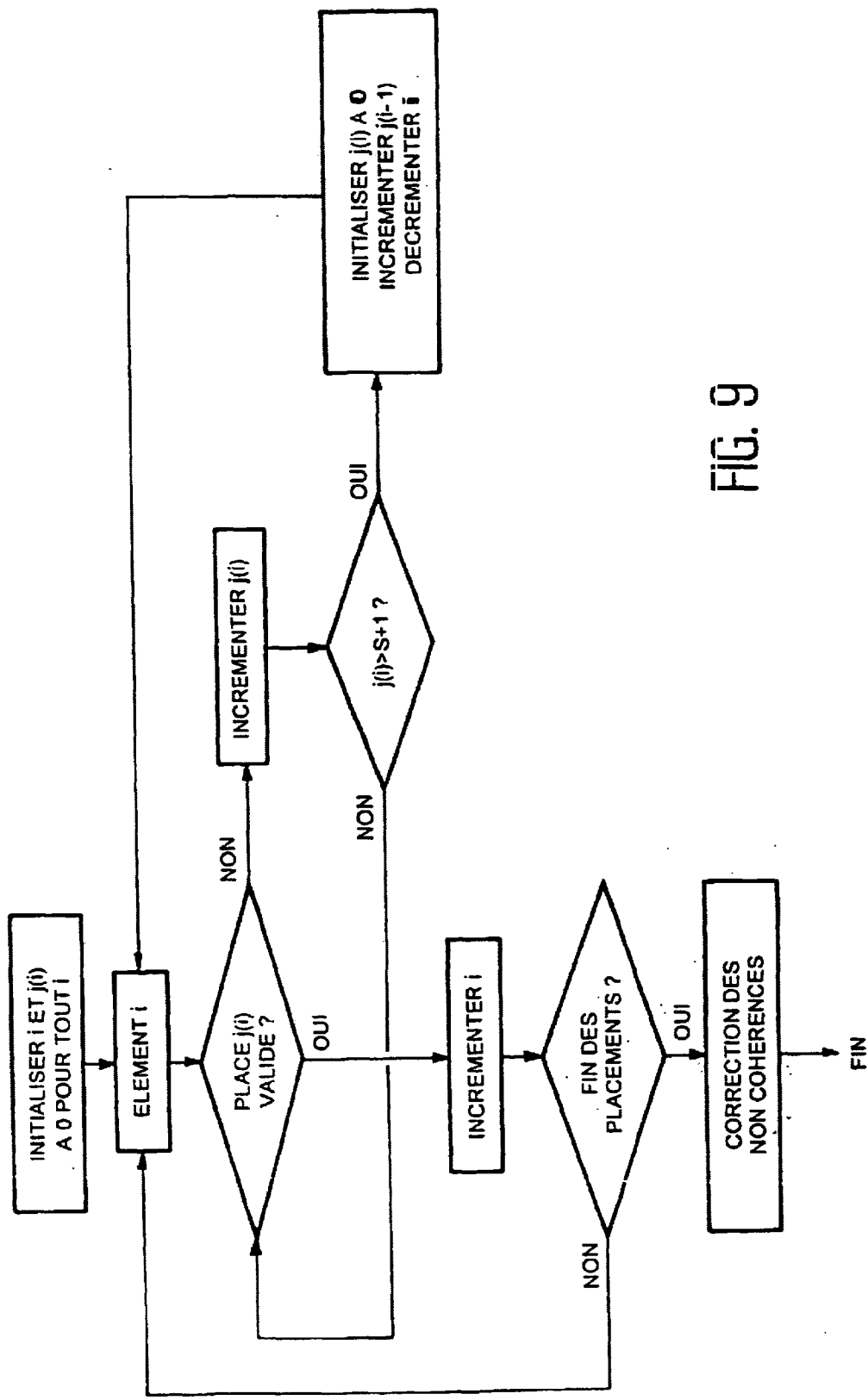
FIG. 9 illustrates a flowchart of the inventive method.

The flowchart illustrated in FIG. 9 sums up the last three steps of this method.

Figure 10A:
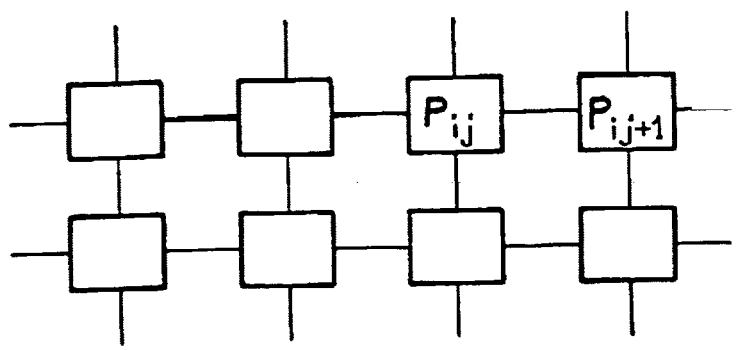
FIGS. 10A and 10B illustrate an example of inconsistency of the inventive method after the processors have been positioned.
Figure 10B:
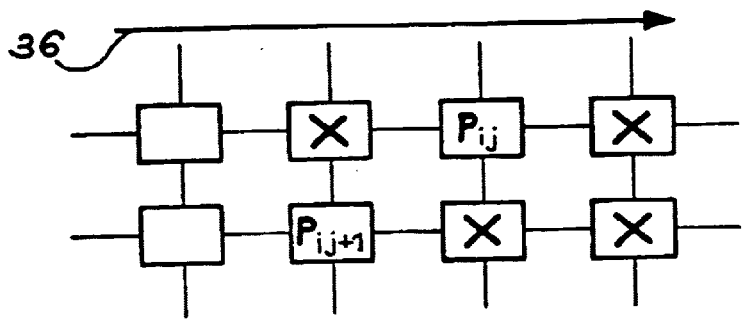

FIGS. 10A and 10B illustrate an example of inconsistency in the network after processors have been positioned. Indeed, in FIG. 10A, both processors $P_{ij}$ and $P_{ij+1}$ are logical neighbours and $P_{ij}$ is located before $P_{ij+1}$. In FIG. 10B, processor $P_{ij}$ is positioned after processor $P_{ij+1}$ in contrast with the logical sequence, with arrow 36 illustrating the positioning sequence, points marked with a cross indicating positions occupied by faulty processors.

This positioning algorithm is bound to reach a solution provided the number of faulty processors is less than or equal to the number of spare processors.

Two types of positioning algorithms can be deduced from the inventive method.

The first type of algorithm consists in directly using the inventive method and is illustrated by FIG. 11 with a structure of 4×4 elementary processors and 4 spare processors.

Figures 11A, 11B, 11C:
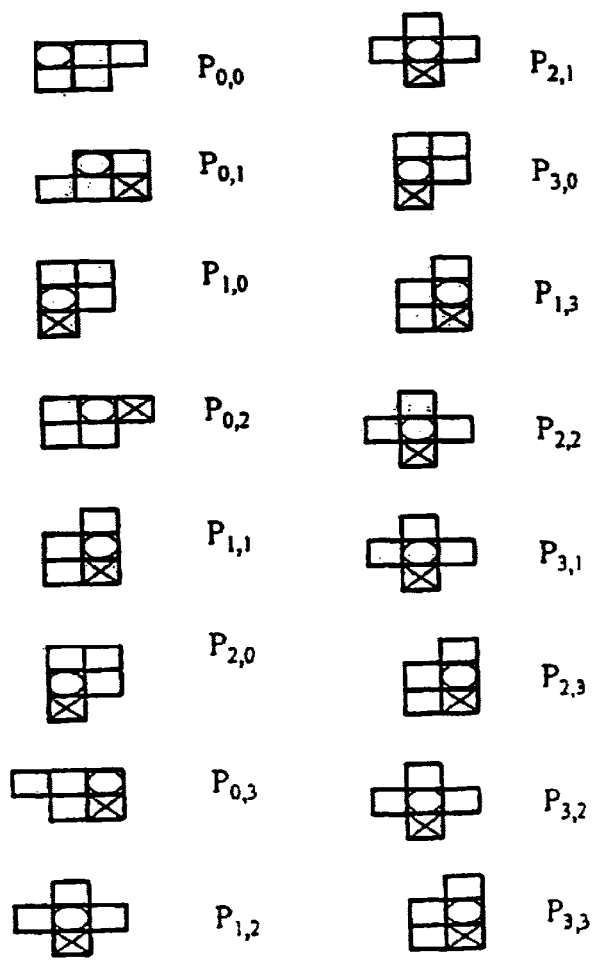
FIGS. 11A, 11B and 11C illustrate a sample positioning algorithm directly derived from the inventive method.

FIG. 11A illustrates the logic network, the logical neighbours of a processor being at 4 cardinal points thereof. FIG. 11B illustrates the positioning sequence of the operational processors and FIG. 11C illustrates the possible positions of these processors, the positions at a distance of 1 from the logical position of the processor being tested before the positions at a distance of 2, etc.

In this FIG. 11C, the following symbols are used:

○: logical position of the processor x: new position of the processor

□: possible position of the processor

The positioning sequence is defined like this: the starting processor is the top left processor $P_{0,0}$. The following processors are the processors to the right $P_{0,1}$ and below $P_{1,0}$ the starting processor $P_{0,0}$ and so on, following the diagonal $P_{1,0}$; $P_{0,2}$; $P_{1,1}$ ... (see FIG. 11B). This solution, which is one of the possible solutions for the choice of the positioning sequence, has the advantage of allowing criterion 1 to be correctly followed in the series, and thus to provide positioning enabling proper routing. Based on this positioning sequence, the positions of each processor are chosen from the five positions defined in FIG. 11C, their selection sequence complying with criterion 1. It is noted that for each processor, criterion 2 is complied with.

Figure 12:
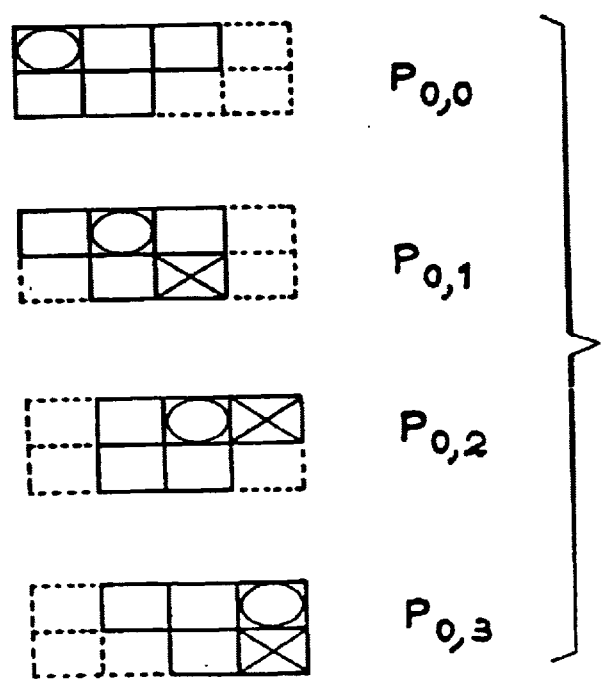
FIG. 12 illustrates a block algorithm derived from the inventive method.

The second type of positioning algorithm is an application of the inventive method by dividing the network into processor blocks. After having defined a block positioning sequence, starting with a starting block, all blocks are passed, from one neighbouring block to the next. If such an algorithm is applied to each block by taking into account a positioning rule so that the possible positions for the processors of one block do not include any logical position of the processors of previously positioned blocks, positioning is ensured. FIG. 12 illustrates this second type of algorithm considering a block composed of one line of four processors. The lines of processors are then positioned starting with the top line and going to the bottom line. For each line, positions are used of this line, to which the logical processors belong, and of the immediately lower line, which allows the above rule to be followed. For each line, the positioning sequence is defined by the starting processor located at the leftmost end and then by the processors following to the right. The five possible positions are then defined as shown in FIG. 12. The same positioning algorithm is used for each line. Consistency checking, which is not required in the example considered, must then be done for lines only. The advantage of this alternative of the inventive method is algorithm speed (less going back, shorter consistency checking) together with correct positioning when blocks are actually dimensioned with respect to spare processors, which is the case in the example considered.

Figure 13:
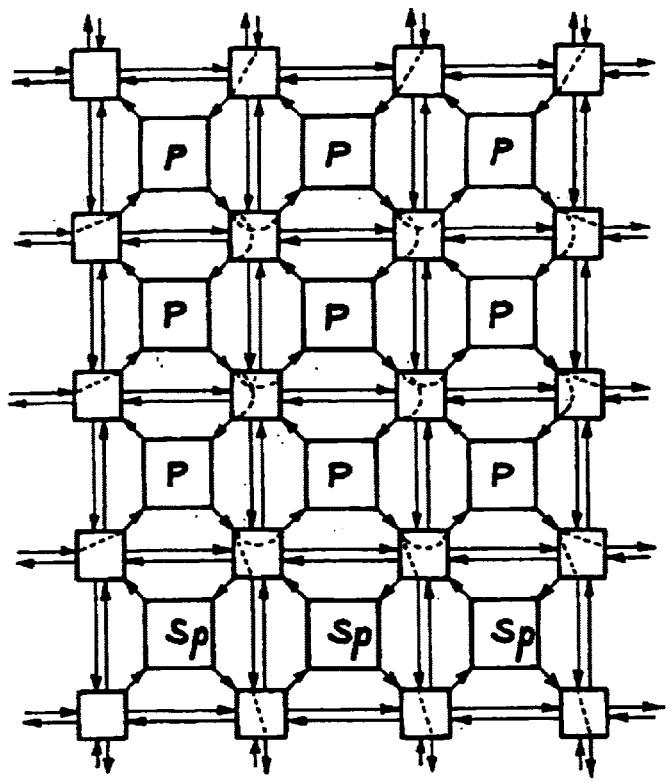
FIGS. 13A and 13B illustrate network reconfiguration examples in a matrix topology.
Figure 13:
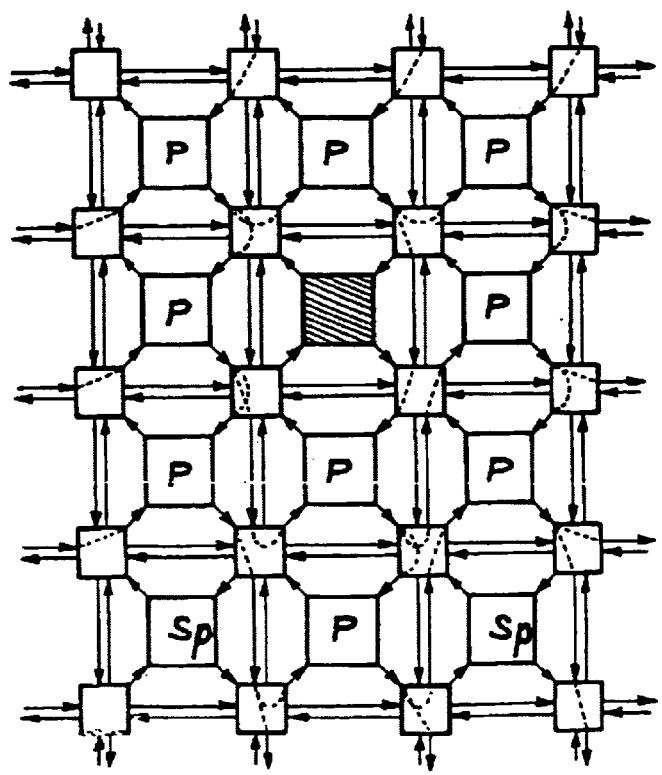

FIG. 13A illustrates a sample configuration of the network in a matrix topology, without any faulty processors, for West/East and North/South connections. FIG. 13B illustrates a sample reconfiguration of the network in the case of a faulty processor, represented as shaded.

It is noted that it is mandatory to pass through the switching elements even if there are no faulty processors, giving the whole system a certain consistency.

Routing Step

This step is performed by means of an algorithm for searching the shortest track, known by those skilled in the art.

In order to be in line with the objects determined in the introduction, the number of interconnecting elements between logical neighbouring processors is limited to a small number, typically 3 or 4. The number of possible tracks for going from one processor to a neighbouring processor is known and rather low, less than about ten as an average. It is assumed that all tracks are known. A simple example of the algorithm routing interconnecting elements is given below:

Set i and j to 0

Point 0: For the pair $C_j$ of neighbouring processors:

Point1: If track $C_j(i)$ exists:

test routing $C_j$ with this track

If there is a conflict with an interconnecting element
increment i and return to Point 1

Else,
If there are other processor pairs C:
increment j and return to Point 0
Else,
routing successful, end Else,
If there is a processor pair $C_k$ the routing of which makes
routing of $C_j$ impossible
Delete all routings between $C_k$ and $C_j$
Increment track i of $C_k$ and return to point 0
Else
Routing impossible End This is just a sample routing known to those skilled in the art which allows to give an illustrative embodiment of the inventive reconfiguration method.

Illustrative Embodiment of a Processor Network According to the Invention

In this embodiment, the processor network is composed of a matrix of nine processors and sixteen interconnecting elements. Each processor P is a simple computing element integrating an arithmetic and logic unit, a set of work registers, and a test logic allowing the automatic test of the processor (the so-called "integrated" test) to be performed. When a test program is run, this logic transmits an integrity testing signal t_i indicating whether the processor is faulty. Processor P is not described herein as it is well known to those skilled in the art.

Figure 14:
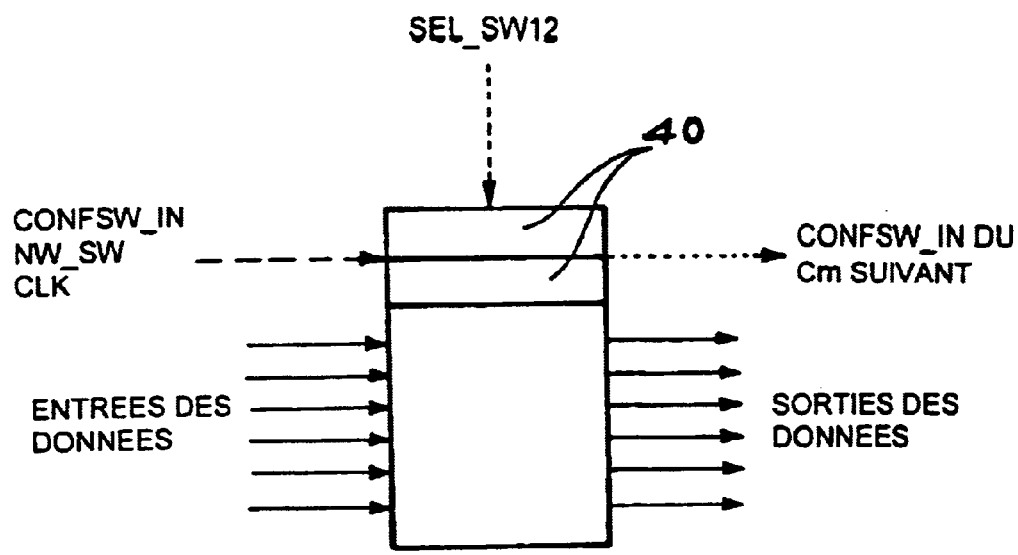
FIGS. 14A and 14B illustrate the practical implementation of an interconnecting element based on a 6-to-1 multiplexer.
Figure 14:
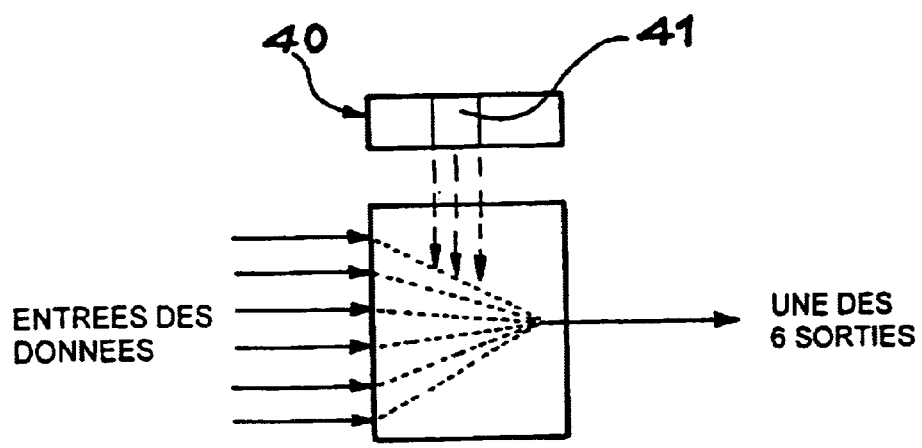

An interconnecting element is of the type as illustrated in FIG. 3; the interconnecting elements of FIGS. 4A to 4H only being simplified derivatives thereof. This interconnecting element, as illustrated in FIG. 14A, is composed of six data multiplexers having six inputs to one output. Each of these multiplexers is controlled by three wires for selecting the output channel in order to allow each of the outputs of the interconnecting element to be connected to any input. The data field width of each of the channels is 4 bits in this case. The selections of the six multiplexers are stored in two 40 and 18-bit registers each (3 selection bits for each multiplexer) inside the interconnecting element. These registers 40 have a double functionality as they can operate as standard registers and shift registers when loaded. These two configuration registers 40 allow two different configurations of the network to exist together dynamically.

FIG. 14B illustrates the details of the multiplexer control, with area 41 being the control area of this multiplexer in one of registers 40.

Loading both reconfiguration registers 40 is done serially by means of the signals nw_sw and confsw_in. The signal nw_sw ("not-write switch") allows the configuration signal confsw_in ("configuration switch input") to be written in the first flip-flop of a register 40 when it is low and prohibits this write operation when it is high. Configuration loading is synchronous and thus dependent on the global system clock clk. When the write operation of confsw_in is authorized in the first flip-flop of one of registers 40, the contents of this flip-flop are loaded into the second flip-flop and so on, up to the last flip-flop, the contents of which are the signal confsw_in of the next interconnecting element. During the load operation, the signal sel_sw12 ("selection switch configuration ½") allows the register wherein configurations are to be loaded to be selected and also the configuration of the interconnecting elements to be selected dynamically, i.e. configuration of the interconnecting elements to be varied during a program run, at each clock period. An interconnecting element is thus composed of 24 data bits at the input, 24 data bits at the output, two configuration loading signals and one dynamic configuration change signal (during normal operation) between the configurations loaded into the internal registers of the interconnecting elements.

Figure 15:
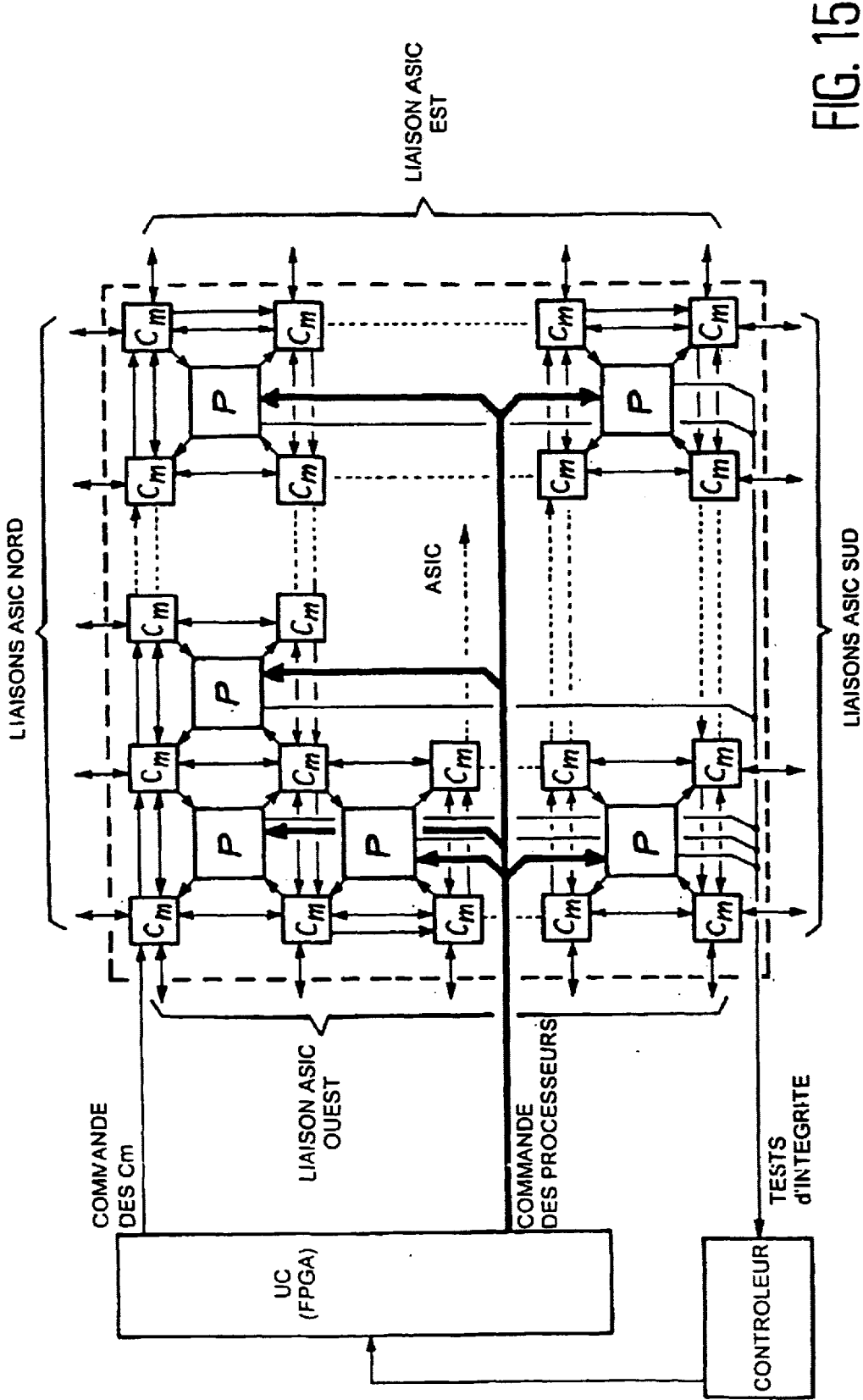
FIG. 15 illustrates a sample implementation of the network of the invention.

Processors P and interconnecting elements Cm are connected as illustrated in FIG. 15. The unit composes the matrix of processors which is controlled by a control unit CPU. This control unit CPU sends instructions to the processors enabling operations to be performed and controls the interconnecting elements by means of the three signals confsw_in, nw_sw, and sel_sw12 mentioned previously. The control unit thus allows to run standard programs as well as processor test programs. The control unit periodically performs the processor test which feed back their status to a controller via the signal t_i. The diagnostic of the processor matrix is then performed by the controller by interpreting the signals t_i of all processors. The controller can perform the calculation of the new configurations of the interconnecting elements corresponding to the status of the processor matrix. It then informs the control unit of these new configurations. The control unit then sends the information allowing to configure different interconnecting elements, then sends the orders for running calculation programs on the active processors.

The processor matrix as well as the interconnecting elements can be integrated into an application specific integrated circuit (ASIC). The control unit can be integrated in reconfigurable logic components (FPGA="Field Programmable Gate Array"), for greater flexibility of use. The controller can be implemented by means of a computer, an FPGA component or even a dedicated module.

In the preceding description, separate dynamic control by the control unit of each of the interconnecting elements has been envisaged; without leaving the scope of the invention, it would be possible to perform said control statically, without using the control unit, e.g. through a processor outside the system.

REFERENCES

[1] "Architectures électroniques" (CEA Technologies no. 29 "Le traitement du signal et de 1' image", pages 3–5)

[2] "Hardwave-Efficient and Highly-Reconfigurable 4- and 2-Track fault Tolerant Designs For Mesh-Connected Multicomputers" by Nihar R. Mahapatra and Shantanu Dutt (IEEE, 1996, pages 272 to 281)

What is claimed is:

1. A network of parallel elementary processors tolerant of the faults of these processors comprising said elementary processors (P), spare elementary processors (Sp), interconnecting elements (Cm) of these processors, and a control unit, characterized in that it comprises alternately a series of interconnecting element lines and processor lines, each processor being surrounded by four interconnecting elements, with the processors lines being elementary processor lines, the last processor line being a spare elementary processor line, the edge network elements being interconnecting elements; and in that the control unit, connected to the processors and interconnecting elements, sends instructions to the processors, controls the interconnecting elements, and checks the integrity of these processors, wherein each processor (P) is connected to four interconnecting elements (Cm), two of these diametrically opposed elements being connected to the two inputs of processor (P), the other two elements, also diametrically opposed, being connected to the two outputs of processor (P), these interconnecting elements (Cm) being connected together through vertical or horizontal links.

2. The network according to claim 1, wherein the interconnecting elements (Cm) inside the network have a complexity of six inputs and six outputs, four inputs and four outputs being connected to the interconnecting elements (Cm) inside the neighbouring network, and two inputs and two outputs being connected to the neighbouring processors of the interconnecting element (Cm) inside the considered neighbouring network.

3. The network according to claim 1, wherein an interconnecting element (Cm) has at least one unidirectional output and one unidirectional input connected to one input or one output of at least one South/West, North/East, North/West, or South/East processor, and at least two unidirectional inputs and two unidirectional outputs of the interconnecting elements located North, East, South, or West.

4. The network according to claim 1, wherein a processor is a computing element integrating an arithmetic and logic unit, a set of work registers, and a test logic allowing the automatic test of said processor to be run.

5. The network according to claim 1, wherein an interconnecting element is composed of several data multiplexers with n inputs to one output, each of these multiplexers being controlled by the wires for selecting the output channel in order to allow each of the outputs of the interconnecting element to be connected to any input, the selections of the multiplexers being stored in two internal registers of said interconnecting element.

6. The network according to claim 1, wherein the processors and the interconnecting elements are integrated in an application specific integrated circuit, the control unit being integrated in reconfigurable logical components.

7. A method for reconfiguring the processor network according to claim 1, comprising:

a step of positioning the operational processors of the logic network;

a routing step of programming interconnecting elements on the physical network, by choosing a maximum number of interconnecting elements which can be passed between two neighbouring processors using an algorithm for searching for the shortest track.

8. The method according to claim 7, wherein:

a network processor positioning sequence which is composed of a starting processor and a sequence of processors including all processors is determined;

For each of the processors, it is positioned tentatively starting with its logical position, then, if required in case of failure, in each of the positions located at a distance 1, distance 2, . . . from the logical position of this processor, a restriction being that one spare position is to be used with respect to the possible positions of previously positioned processors, stopping when S+1 positions have been tested, S being the number of spare processors;

if S+1 positions have been tested without success, returning to the previous processor in the positioning sequence and proceeding with the next position for this processor.

9. The method according to claim 8, wherein, when all processors have been positioned, it is checked for each network dimension that the logical sequence is followed for each processor pair, if not, the positions of these processors are inverted.

10. The method according to claim 7, wherein the positioning sequence is defined like this: the starting processor is the top left processor, the following processors are the processors to the right and below the starting processor, and so on, following a diagonal.

11. The method according to claim 7, wherein the network is divided into processor blocks, and a block positioning sequence is defined starting with a starting block and going through all the blocks from one neighbouring block to the next, the possible positions for the processors of one block not including any logical position of the processors of previously positioned blocks.

* * * * *